United States Patent [19]

Edson

[11] Patent Number: 4,688,591
[45] Date of Patent: Aug. 25, 1987

[54] MANUAL RELIEF GAS VENT

[75] Inventor: Steven S. Edson, Elkridge, Md.

[73] Assignee: W. R. Grace & Co., New York, N.Y.

[21] Appl. No.: 925,862

[22] Filed: Oct. 30, 1986

[51] Int. Cl.⁴ .............................................. F16L 55/18
[52] U.S. Cl. ........................ 137/15; 137/312;
137/559; 220/DIG. 27; 251/216; 251/225;
73/40
[58] Field of Search ........................ 220/206, DIG. 27;
73/40; 137/551, 559, 312, 382, 15, 315;
251/144, 216, 225

[56] References Cited
U.S. PATENT DOCUMENTS 493,806  3/1893  Baum ...................................... 251/225
783,024  2/1905  Cox, Jr. .................................. 251/144

FOREIGN PATENT DOCUMENTS 0011333  2/1981  Japan ....................................... 73/40

Primary Examiner—A. Michael Chambers
Attorney, Agent, or Firm—Edward J. Cabic

[57] ABSTRACT

A manually operated vent valve assembly for a bung hole in a drum lid. The low profile valve assembly is inserted into the bung hole and the lid sealed. The drum is vented by opening a valve stem in the assembly. The vented gas leaves through a gas outlet which is recessed in a reservoir within the valve assembly. By filling the reservoir with fluid, the venting gas can be observed as bubbles.

21 Claims, 1 Drawing Figure

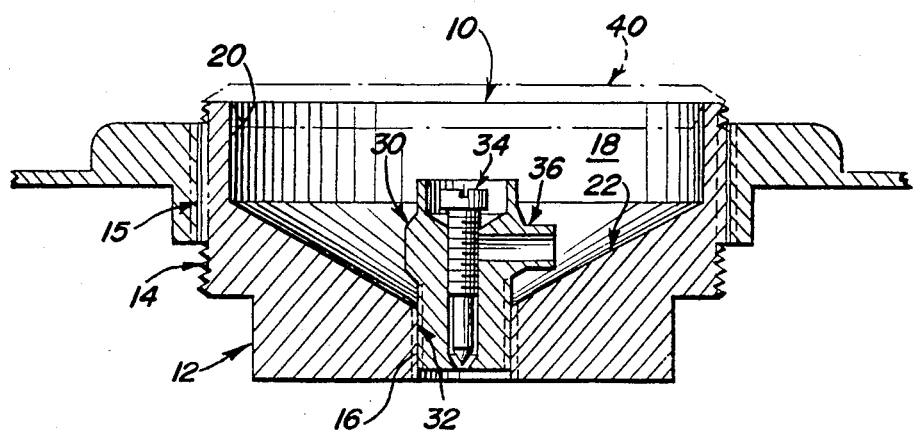

MANUAL RELIEF GAS VENT

BACKGROUND OF THE INVENTION

1. Field of the Invention

This invention relates to a manual relief gas vent which can be placed in drums to control the pressure in the drum.

2. Description of the Previously Published Art

Various chemical materials have been stored in sealed drums. Some of these materials will produce a gas. After a period of time a gas pressure will build up and a problem develops as to how to safely vent the gas, especially when it is an explosive gas such as hydrogen. For example, when Raney nickel is stored in a sealed drum, there is a tendency for hydrogen gas to be generated. If the sealed drum is not vented, the gas pressure will build up and it can cause the drum lid to be blown off. When the drum is opened for use, it is necessary to carefully open the drum band and slowly pry up the lid to relieve any gas pressure which may exist inside. This can be a problem since if there is alot of gas pressure the lid can be blown off causing burns or projectile injury.

One solution to the problem is to use an automatic relief valve which is spring loaded. It could be set to vent the drum whenever the pressure was above a certain level such as 3 psig. There is an environmental control problem with these valves because there is no way to control the gas coming off. If there are many drums in an unvented storage room on a hot day, the drums will all generate alot of gas which the valves will automatically vent to the room. There will be no way to prevent the gas from accumulating in the room.

Gas vents have been placed in drums in the past, but these vents extend vertically to some extent such that they extend above the rim of the drum when they are inserted into the bung hole of the drum lid. When the valves extend above the drums, it is not possible to stack the drums one on top of the other.

3. Objects of the Invention

It is an object of this invention to have a valve assembly for a drum which is compact and which fits in the bung hole of a drum so that it does not extend above the height of the drum rim.

It is a further object of this invention to have a manually operated gas relief valve which can be safely operated to vent even explosive gas from a sealed drum, while providing a positive seal when such venting is prohibited.

It is a further object of this invention to have a valve assembly for a drum where the valve outlet is protectively positioned in a reservoir within the valve assembly.

It is a further object of this invention to have a valve assembly where the valve outlet discharges into a reservoir which can be filled with water or other inert fluid to detect the flow of gas from the outlet as bubbles in the reservoir.

It is a further object of this invention to have a valve assembly that provides and identifies a positive neutral drum condition exists prior to drum opening without concern of plugging or other vent failure.

These and further objects will become apparent as the description of the invention proceeds.

SUMMARY OF THE INVENTION

A drum valve assembly has been made for insertion into a threaded bung opening in a drum lid. The assembly is inserted from the underside of the drum lid. It is made of a cylindrical reducer housing having a tapered thread outside surface which engages the straight thread bung opening in the drum lid. When it is inserted into the threaded bung opening from the underside, the top part of the reducer housing is below the height of the drum rim. Preferably a liquid sealant is applied between the threads. The reducer housing has a substantial hollow opening in the upper portion forming a reservoir and a smaller diameter internal opening in the lower portion which communicates between the bottom side of the housing and the reservoir.

A valve stem housing is positioned within this internal opening of the reducer housing and its lower outside surface engages the internal opening of the reducer housing. Preferably both surfaces are threaded with complimentary tapered threads. The valve stem housing has a valve outlet on the upper portion of the housing which opens into the reservoir in the reducer housing. Within the valve stem housing a valve stem is positioned to control the flow of fluid through the valve stem housing and out the valve outlet. Because of the construction of the drum valve assembly, the top of the valve stem housing and the valve outlet will be below the top of the reducer housing and thus protected.

A protective cap can be placed over the drum valve assembly to keep out foreign matter and freezing liquids and the valve is preferably made of a spark resistant material. During operation, the reservoir can be filled with an inert fluid such as water. When the valve stem is opened, the operator can visually confirm that the gas is venting by watching the bubbles of vented gas rising up to the surface.

BRIEF DESCRIPTION OF THE DRAWING

The Figure illustrates a cross-section of the drum valve assembly according to the present invention.

DESCRIPTION OF THE PREFERRED EMBODIMENTS

In a preferred embodiment illustrated in the drawing, the drum valve assembly 10 is made of a cylindrical reducer housing member 12 which has outside tapered threads 14 on the upper surface of the housing which will be threadably engageable with the straight threads of the bung hole 15 of the drum lid. Within the center of the reducer housing is the taper threaded central opening 16 into which will be inserted the valve housing. The reducer housing has a reservoir opening 18 in the upper portion which in a preferred embodiment is formed by the inside cylindrical wall 20 and the conical portion 22 which extends from that wall down to the central opening 16. Instead of having the conical portion 22, the reservoir could be formed with a flat bottom surface.

The valve housing 30 is preferably a standard, commercially available valve assembly which is inserted into the threaded central opening 16. The valve housing has a complementarily taper threaded lower part 32 which engages the tapered thread 16 of the opening in the reducer housing. Preferably a gas tight sealant is applied between the two sets of threads and more preferably a liquid thread sealant is used. The upper portion of the valve housing 30 has the valve stem 34 therein and a valve opening 36 which opens into the reservoir 18. The valve housing is preferably made of a spark resistant material with nickel plated brass being particularly preferred. Other valve housings could be used without outside threads provided that sufficient engagement means are provided to secure the valve housing in the central opening.

An optional weather cap 40 made out of a plastic or rubber material can be inserted over the reservoir to protect the valve stem and the valve outlet in the reservoir from freezing liquid or foreign matter. As shown in the Figure, the cap can fit over the top of the housing and snap fit into the reservoir.

In operation, the drum valve assembly is inserted into a bung hole of a drum lid from the underside of the lid. The valve stem is tightened and the assembly acts as a secure seal. In a preferred embodiment the seal can be made gas tight by applying a sealant between the bung hole and the reducer housing. This can be in the form of a mechanical seal between the two components or preferably in the form of a sealant applied to the threads. Preferably a liquid thread sealant can be used such as Loctite RC/620, a retaining compound made by Loctite Corp. or its equivalent.

When it is desired to check or vent the drum, the reservoir may be filled with water or some other inert fluid. Should there be gas under pressure in the drum, then when the valve stem is slightly opened the small leakage of gas will be very readily seen by the bubbles of gas coming up through the water or other inert fluid. The operator can continue to either vent the gas or else close the valve stem to maintain the gas under pressure in the drum.

When it is desired to slowly vent the drum, the operator can open the stem valve and determine how much gas is coming out by observing how many bubbles are flowing up through the reservoir.

A further feature of the system is that it provides a positive indication that the drum is in a neutral condition. If there is water in the reservoir and the valve stem is completely removed, then if the water flows down into the drum the operator knows that there is no gas pressure in the drum and that the valve opening into the drum is not plugged. With this assurance that the drum is in a neutral condition, the operator can then proceed to safely open the drum lid.

The valve assembly with the liquid thread sealant has been successfully tested on a drum. It met the Department of Transportation's 6B Drum Specification (Section 178.98) for impact testing and pressure testing. Because the valve stem is recessed in the reducer housing, it will not be harmed when the drum tips over or when another drum is placed on top of the first drum.

The arrangement of the components of the drum valve assembly permit a variety of tools to access the parts so that the unit can be easily assembled.

It is understood that the foregoing detailed description is given merely by way of illustration and that many variations may be made therein without departing from the spirit of this invention.

What is claimed is:

1. A method of sealing a drum which will be containing a gas under pressure comprising
   inserting from underneath in the bung hole of the drum lid the drum valve assembly comprising
   a cylindrical reducer housing having
   (a) a tapered thread outside surface for engagement with the straight thread bung opening in a drum lid such that upon insertion into the threaded bung opening from the underside the top of the reducer housing is below the height of the drum rim;
   (b) a substantial hollow opening in the upper portion of the reducer housing forming a reservoir; and
   (c) a smaller diameter internal opening in the lower portion of the reducer housing for communication between the bottom side of the housing and the reservoir;
   a valve stem housing positioned within the internal opening of the reducer housing and having means on the lower outside surface to engage the internal opening of the reducer housing, said valve stem housing having a valve outlet on the upper portion of the housing which opens into the reservoir in the reducer housing;
   a valve stem in the valve stem housing to control the flow of fluid through the valve stem housing and out the valve outlet; whereby the top of the valve stem housing and the valve outlet are below the top of the reducer housing; and
   sealing the drum lid to the drum.

2. A method of sealing a drum according to claim 1, further comprising first applying a thread sealant to the threads of the reducer housing of the drum valve assembly.

3. A ventable sealed drum comprising
   a drum;
   a lid secured to said drum with a bung opening; and
   a drum valve assembly comprising
   a cylindrical reducer housing having
   (a) a tapered thread outside surface for engagement with the straight thread bung opening in a drum lid such that upon insertion into the threaded bung opening from the underside the top of the reducer housing is below the height of the drum rim;
   (b) a substantial hollow opening in the upper portion of the reducer housing forming a reservoir; and
   (c) a smaller diameter internal opening in the lower portion of the reducer housing for communication between the bottom side of the housing and the reservoir;
   a valve stem housing positioned within the internal opening of the reducer housing and having means on the lower outside surface to engage the internal opening of the reducer housing, said valve stem housing having a valve outlet on the upper portion of the housing which opens into the reservoir in the reducer housing; and
   a valve stem in the valve stem housing to control the flow of fluid through the valve stem housing and out the valve outlet; whereby the top of the valve stem housing and the valve outlet are below the top of the reducer housing, said drum valve assembly being inserted into said bung opening from the underside.

4. A sealed drum according to claim 3, wherein a sealant is applied between the reducer housing and the bung opening.

5. A sealed drum according to claim 4, wherein the sealant is applied between the threads of the bung opening and the outside threads of the reducer housing.

6. A sealed drum according to claim 5, wherein the sealant is a liquid thread sealant.

7. A method of checking the gas pressure in a ventable sealed drum according to claim 5, comprising filling the reservoir to a level above the top of the valve outlet with an inert fluid and opening the valve stem, whereby if gas is present it will be visually indicated by the bubbles forming in the liquid.

8. A method according to claim 7, wherein the inert fluid is water.

9. A method of checking the gas pressure in a ventable sealed drum according to claim 3, comprising filling the reservoir to a level above the top of the valve outlet with an inert fluid and opening the valve stem, whereby if gas is present it will be visually indicated by the bubbles forming in the liquid.

10. A method according to claim 9, wherein the inert fluid is water.

11. A drum valve assembly for insertion into a threaded bung opening in a drum lid from the inside out comprising
   a cylindrical reducer housing having
   (a) a tapered thread outside surface for engagement with the straight thread bung opening in a drum lid such that upon insertion into the threaded bung opening from the underside the top of the reducer housing is below the height of the drum rim;
   (b) a substantial hollow opening in the upper portion of the reducer housing forming a reservoir; and
   (c) a smaller diameter internal opening in the lower portion of the reducer housing for communication between the bottom side of the housing and the reservoir;
   a valve stem housing positioned within the internal opening of the reducer housing and having means on the lower outside surface to engage the internal opening of the reducer housing, said valve stem housing having a valve outlet on the upper portion of the housing which opens into the reservoir in the reducer housing; and
   a valve stem in the valve stem housing to control the flow of fluid through the valve stem housing and out the valve outlet; whereby the top of the valve stem housing and the valve outlet are below the top of the reducer housing.

12. A drum valve assembly according to claim 11, wherein a sealant is applied between the reducer housing and the bung opening.

13. A drum valve assembly according to claim 12, wherein the sealant is applied between the threads of the bung opening and the outside threads of the reducer housing.

14. A drum valve assembly according to claim 13, wherein the sealant is a liquid thread sealant.

15. A drum valve assembly according to claim 11, further comprising a protective cap means positioned over the reservoir to cover the valve stem and the valve outlet.

16. A drum valve assembly according to claim 11, wherein the reservoir in the reducer housing is formed by a cylindrical internal wall at the top which is connected via a conical surface to the internal opening in the lower portion of the reducer housing.

17. A drum valve assembly according to claim 11, wherein the internal opening of the reducer housing is threaded with a tapered thread and wherein the means on the lower outside surface of the valve stem housing is a complimentary tapered thread means which engages the tapered threads of the internal opening.

18. A drum valve assembly according to claim 17, wherein a sealant is applied between the threads of the internal opening and the tapered thread means on the valve stem housing.

19. A drum valve assembly according to claim 18, wherein the sealant is a liquid thread sealant.

20. A drum valve assembly according to claim 11, wherein the valve stem housing is made of a spark resistant material.

21. A drum valve assembly according to claim 20, wherein the spark resistant material is nickel plated brass.

* * * * *